US005743002A

United States Patent [19]

Ito et al.

[11] Patent Number: 5,743,002

[45] Date of Patent: Apr. 28, 1998

[54] ELASTIC PART HOLDER FOR USE IN MOUNTING APPARATUS

[75] Inventors: Takashi Ito, Yokkaichi-cho; Tomoji Niwa; Shigeharu Nakahira, both of Yokkaichi, all of Japan

[73] Assignee: Sumitomo Wiring Systems, Ltd., Japan

[21] Appl. No.: 516,012

[22] Filed: Aug. 16, 1995

[30] Foreign Application Priority Data

Sep. 12, 1994 [JP] Japan .................................... 6-217550

[51] Int. Cl.$^{6}$ .................................................... B23P 19/04

[52] U.S. Cl. ................................ 29/754; 29/450; 29/785

[58] Field of Search ............................ 29/450, 451, 754, 29/785, 809, 857, 752

[56] References Cited

U.S. PATENT DOCUMENTS 4,653,182 3/1987 Fukuda et al. ........................... 29/754
5,016,346 5/1991 Gerst et al. ............................... 29/450
5,315,757 5/1994 Koch et al. ............................... 29/754
5,351,385 10/1994 Takano ..................................... 29/450
5,432,996 7/1995 Imgrut et al. ............................ 29/754

FOREIGN PATENT DOCUMENTS 0159006 10/1985 European Pat. Off. .
0359151A3 3/1990 European Pat. Off. .
5266959 10/1993 Japan .

*Primary Examiner*—P. W. Echols
*Attorney, Agent, or Firm*—Jordan B. Bierman; Bierman, Muserlian and Lucas

[57] ABSTRACT

A holder for retaining an elastic part while a wire is inserted therein including a contact holding portion gripping a neck of the plug. The contact holding portion has an annular groove for absorbing elastic deformation of the plug resulting from insertion of the wire. The rubber plug is positioned and held in the holder; since the elastic deformation thereof is accommodated by the annular groove, the wire insertion can be smoothly performed without inward pressure on the wire being inserted.

7 Claims, 5 Drawing Sheets

ELASTIC PART HOLDER FOR USE IN MOUNTING APPARATUS

This Application claims the benefit of the priority of Japanese Application 6-217550, filed Sep. 12, 1994.

The present Invention relates to a holder for retaining an elastic part. Such holders are used (for example) in apparatus for mounting a rubber plug on an end of a wire to prevent entry of water. The Invention is also directed to a method for inserting the wire into the rubber plug.

BACKGROUND OF THE INVENTION

In general, in order to prevent entrance of rain or other moisture into a connector mounted at the end of a wiring harness installed, for example, in an engine compartment of an automotive vehicle, rubber plug 3 is mounted at the end of wire 1 when terminal fitting 2 is cramped onto the ends of wire 1 as shown in FIG. 6. Rubber plug 3 is a substantially hollow cylinder and the inner diameter thereof is slightly smaller than the outer diameter of wire 1. Thus, rubber plug 3 is in close elastic contact with the outer surface of the wire 1, thereby preventing water from entering between the outer surface and rubber plug 3. As plug 3 is mounted on wire 1 and inserted, plug 3 undergoes elastic deformation in its radially outward direction.

The rubber plug can be mechanically mounted as disclosed in Japanese Patent Publication 5-266959. Specifically, the plug is held in a holder and the wire is retained by a clamp. By moving the clamp forward, the wire is inserted. Since the holder surrounds the plug, unwanted looseness is produced if there is substantial clearance between the outer surface of the plug and the inner surface of the holder; as a result, the plug cannot be accurately positioned in the wire inserting direction. Accordingly, the wire to be inserted comes into contact with the front end of the rubber plug, rather than the hole, and thus cannot be inserted.

On the other hand, if there is no clearance between the outer surface of the plug and the inner surface of the holder, the plug can be accurately positioned and therefore the wire can be inserted. However, such a holder does not permit radial elastic deformation of the plug which should result from the insertion of the wire. This leads to an increase in the resistance created by the insertion of the wire, which may cause it to bend. Thus, the wire may not be securely inserted.

Even if the wire can be inserted, since the radial elastic deformation of the plug is not permitted, the inner surface and the peripheral portion of the plug may be deformed in the wire inserting direction due to the frictional resistance between the outer surface of the wire and the inner surface of the plug. This deformation may remain even after insertion of the wire and result in the inner surface of the plug being partially out of contact with the outer surface of the wire, or the plug being displaced along the wire when the remaining deformation is released upon disengaging the plug from the plug holder. The waterproof seal of the rubber plug may thus be impaired.

SUMMARY OF THE INVENTION

An object of the Invention is to provide a holder capable of accurately positioning the elastic part in a predetermined position and permitting the radial elastic deformation which results from the insertion of a wire, whereby the mounting of the part on the end of the wire can be smoothly and securely accomplished. The Invention will be described in connection with a rubber plug, but it is understood that it is suitable for any elastic part into which an elongated member is to be inserted.

In the present Invention, a contact holding portion embraces or surroundingly holds the neck of the rubber plug, so that the plug is held and positioned in the rubber plug holder. When the elongated part (hereafter the wire) is inserted into the held rubber plug, the plug is radially outwardly elastically deformed. The elastic deformation at the neck of the plug is received by the deformation permitting portion. Thus, during the wire insertion, the rubber plug is not deformed in its radially inward direction, i.e. in a direction which will cause it to tighten around the wire being inserted. Thus, the wire insertion can be smoothly and securely performed without increasing the resistance to the entry of the wire.

Preferably, the holder comprises a positioning portion for restricting the movement of the plug in the wire inserting direction while it is being held. Thereby, axial movement of the plug caused by insertion of the wire can be securely restricted. This produces smoother wire insertion and more accurate mounting in the predetermined position on the wire. As a result, problems resulting from the displacement of the rubber plug during the cramping of the terminal fitting can be advantageously prevented.

It is further preferred that the deformation permitting portion is formed in the contact holding portion and comprises an annular groove having an opening facing the holding portion of the plug when it is embraced by the contact portion. There is a particular advantage in that the deformation permitting portion can be easily formed by the annular groove in the contact holding portion. Preferably, the annular groove is intermediate the contact holding portion so that portions of the contact holding portion at opposite sides of the annular groove come into contact with the holding portion of the rubber plug. In other words, the holding portion of the rubber plug is supported or held in two positions by the contact holding portion. Thus, the rubber plug can be more stably held with its longitudinal axis along the wire inserting direction; this aids in achieving a smoother or more secure wire insertion.

As an alternative, it is preferred that the deformation permitting portion is formed by a large diameter portion which is contiguous with the contact holding portion, extends beyond the contact holding portion in the wire inserting direction, and has an inner diameter larger than an outer diameter of the holding portion of the rubber plug. Preferably, the holder further comprises a main holding portion which contacts a main portion of the rubber plug, which main portion is preferably contiguous with the holding portion of the rubber plug and has a large diameter compared therewith.

Particularly, the large diameter portion provides a large space for taking up the elastic radially outward deformation. Accordingly, even if the elastic deformation is very great, it can be releasably absorbed. Thus, during wire insertion, the deformation of the plug in its radially inward direction, i.e. in such a direction as to tighten it around the wire being inserted, can be more reliably prevented. Further, the main portion of the rubber plug is held by the main holding portion.

BRIEF DESCRIPTION OF THE DRAWINGS

In the accompanying drawings, constituting a part hereof, and in which like reference characters indicate like parts.

DETAILED DESCRIPTION OF THE INVENTION

Figure 3:
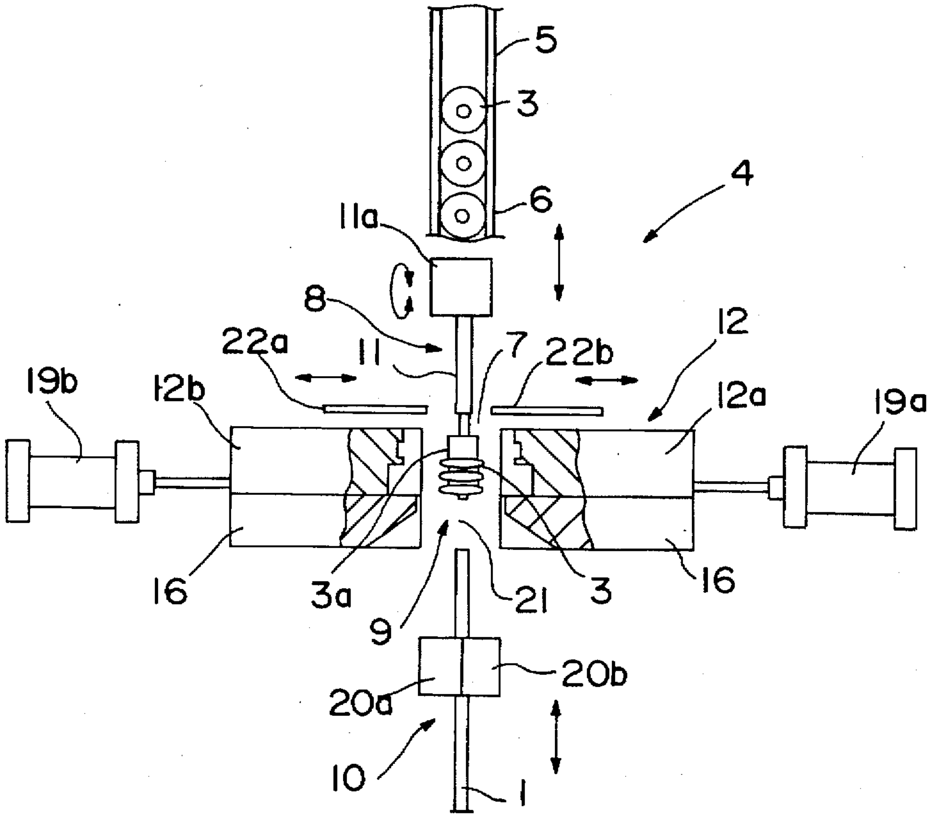
FIG. 3 is a schematic view showing a wire end processing apparatus including the holder according to one embodiment of the Invention.

With reference to FIG. 3, processing apparatus 4 is adapted to strip the sheath from the end of wire 1 and to mount rubber plug 3 thereon. It includes transferrer 8, retainer 9 and clamp 10. Transferrer 8 transfers plugs 3, which are fed along feeding path 5 by a parts feeder (not shown) from receiving position 6 to mounting position 7. Retainer 9 holds plug 3 tightly from opposite sides in mounting position 7. Clamp 10 grips wire 1 which has been cut into a specified length by a wire cutting mechanism (not shown) and places it on the longitudinal axis of plug 3 in mounting position 7.

Transferrer 8 reciprocates and includes rod 11 which is inserted into wire insertion hole **3*c* in plug 3 (see FIG. 1) to transfer plug 3. Rod 11 is mounted on base 11*a* which is rotated between receiving position 6 and mounting position 7. Retainer 9 includes holder 12 which tightly grips neck 3*a* of plug 3 from opposite sides. Holder 12 consists essentially of a pair of holding members 12*a* and 12*b*, which are actuated by cylinders 19*a* and 19*b***, respectively, between a contact position where they abut each other and a withdrawn position in which they are spaced apart from each other.

Figure 1:
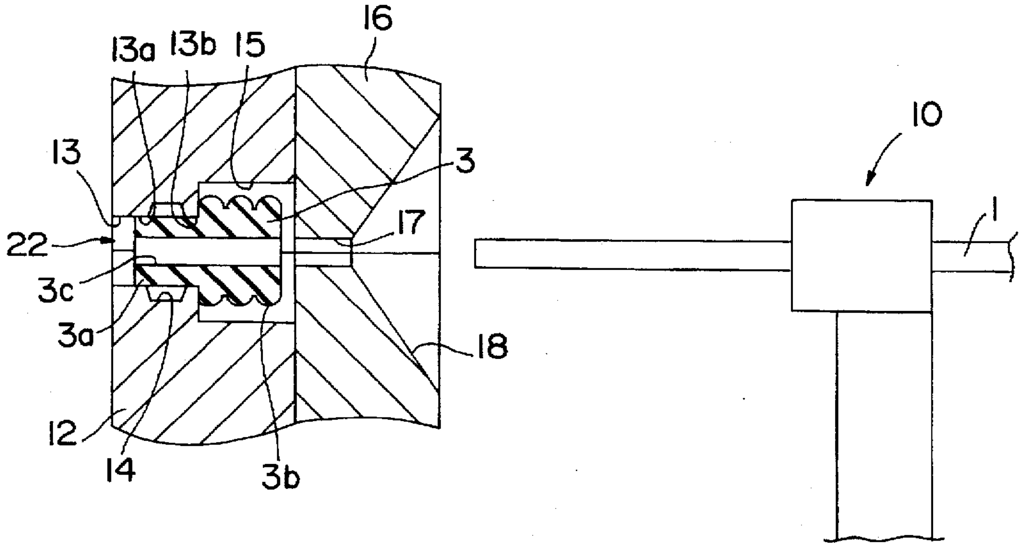
FIG. 1 is an enlarged front view, partially in section, showing the rubber plug held by the holder before insertion of the wire.
Figure 2:
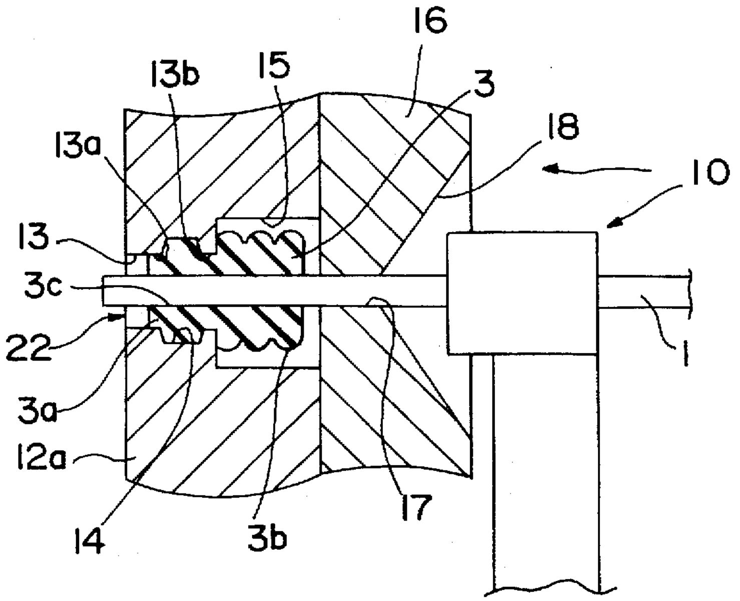
FIG. 2 is a view similar to that of FIG. 1 wherein the wire is inserted into the rubber plug.

As shown in FIGS. 1 and 2, plug chamber 22 is in holder 12 when holding members **12*a* and 12*b* are in their contact position. The contour of chamber 22 is in conformity with the outer configuration of plug 3. In chamber 22, there are formed contact holding portion 13, which is in contact with neck 3*a* when plug 3 is in the chamber 22, and main chamber 15 for accommodating main portion 3*b* of plug 3. Chamber 15 has a diameter larger than that of contact holding portion 13, and is in communication therewith. Chamber 15 has such a shape that different kinds of rubber plugs, each having an identical neck as holding portion 3*a* and different main portion 3*b***, can be accommodated.

Contact holding portion 13 has an inner diameter slightly smaller than the outer diameter of neck **3*a*. Contact holding portion 13 holds plug 3 in close contact therewith. In the inner surface of contact holding portion 13 is annular groove 14 which acts as a deformation permitting portion to allow elastic deformation—particularly, radially outward deformation—produced while plug 3 is tightly held by portion 13**.

Annular groove 14 is open to and faces the intermediate portion of neck **3*a* when plug 3 is accommodated in chamber 22. Thus, plug 3 is held by gripping portions 13*a* and 13*b* of contact holding portion 13 at opposite sides of annular groove 14**.

Guide 16 is disposed before holder 12 and forms guide hole 17 for guiding wire 1 along the longitudinal axis of plug 3 held by holder 12, and guide surface 18 which slants inward toward guide hole 17.

Referring once again to FIG. 3, clamp 10 comprises a pair of chucks **20*a* and 20*b* which are actuated by a driving mechanism (not shown). Wire 1, held by chucks 20*a* and 20*b*, is intermittently and reciprocatingly moved between wire inserting position 21 on the longitudinal axis of held plug 3, a wire measuring position (not shown), which is located at the side of position 21 and where the wire is measured and cut before being inserted, and a cramping position (not shown) where a terminal fitting is cramped onto wire 1 after having its sheath removed by a pair of stripping blades 22*a* and 22*b***.

In operation, referring particularly to FIG. 3, rod 11 of transferrer 8 is inserted, at receiving position 6, into insertion hole **3*c* of the bottommost of plugs 3 which are fed along feeding path 5, thereby transferring plug 3 to rod 11. Subsequently, rod 11 is rotated to convey plug 3 to mounting position 7. Cylinders 19*a* and 19*b* are then operated to bring holding members 12*a* and 12*b* into mutual abutment, thereby accommodating plug 3 in holder 12. With reference to FIG. 1, at this stage, neck 3*a* is held by contact holding portion 13. Rod 11 is then returned to its original position 6 to receive the next plug 3**.

Upon completion of the transfer of plug 3, clamp 10 grips and conveys wire 1, precut to a specified length, to wire inserting position 21. At this stage, chucks **20*a* and 20*b* move forward toward holder 12, thereby inserting wire 1 into wire insertion hole 3*c* through guide hole 17 while being guided by guide surface 18 of guide member 16. According to this embodiment, as shown in FIG. 1, neck 3*a* of plug 3 is held around its outer surface by contact holding portion 13 and thereby retains plug 3 in holder 12. Thus, the close contact with which plug 3 is held by holder 12** permits it to be held in a predetermined position.

When wire 1 is inserted into plug 3, in position 7, the latter is radially outwardly elastically deformed as shown in FIG. 2. The elastic deformation is absorbed when the material of plug 3 enters annular groove 14 through its opening. Accordingly, when wire 1 is being inserted, plug 3 is not deformed radially inwardly, i.e. there is no increased inward pressure on inserted wire 1. Thus, wire 1 can be smoothly introduced into hole **3*c*** without increasing the resistance created thereby..

Further, since annular groove 14 is at an intermediate point of contact holding portion 13, and neck **3*a* is supported in two positions by gripping portions 13*a* and 13*b* at both sides of annular groove 14, plug 3 can be stably held with its longitudinal axis extending along the inserting direction of wire 1**.

Figure 4:
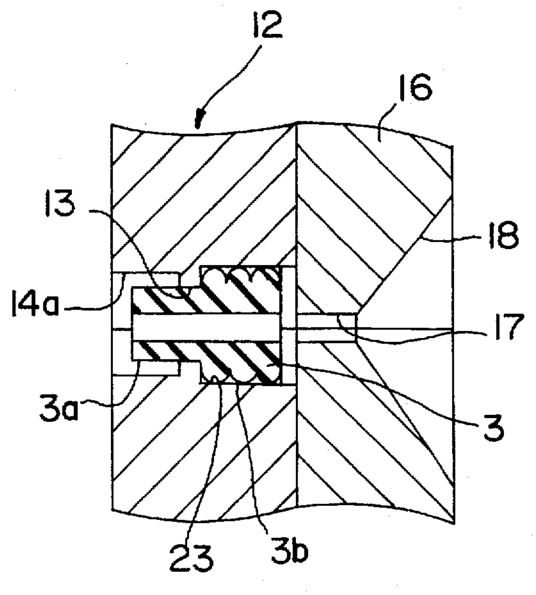
FIG. 4 is similar to FIG. 1 showing a modification of the Invention.

In the embodiment of the Invention shown in FIG. 4, the deformation permitting portion of holder 12 is continuous with contact holding portion 13, extends in the wire inserting direction, and includes large diameter portion **14*a* having an inner diameter larger than the outer diameter of neck 3*a*. Additionally, main holding portion 23 contacts and holds main portion 3*b* of plug 3 and is continuous with neck 3*a* when plug 3 is held by holder 12**. The remainder of this embodiment is the same as that previously described.

In this form of the Invention, large diameter portion **14*a* extends to the rear edge of holder 12 while contact holding portion 13 is at a contiguous transitional portion between neck 3*a* and main portion 3*b*, so that the front part of neck 3*a* is out of contact with contact holding portion 13. In this modification, since portion 14*a* provides a larger space for receiving the elastic deformation of plug 3 than the holder shown in FIGS. 1 and 2, even if deformation is very great, it can be reliably accommodated. Accordingly, during insertion of wire 1, deformation of plug 3 radially inwardly so as to increase the pressure on wire 1** while it is being inserted, can be more securely prevented.

Further, since main portion 3b of plug 3 is held by holding portion 23, its position is properly and firmly maintained during wire insertion. In other words, the plug will not tilt with respect to its axis as the wire is inserted. Due to the fact that the volume of main portion 3b is larger than that of neck 3a, the wire can be inserted smoothly, even though main portion 3b is held by holder portion 23. However, it is not possible to use this type of holder for different kinds of plugs as is possible with the holder shown in FIGS. 1 and 2.

Figure 5:
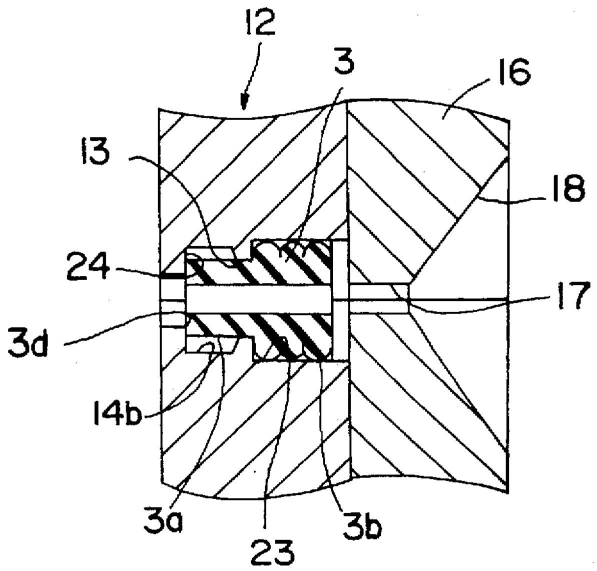
FIG. 5 is similar to FIG. 4 showing another modification of the Invention.
Figure 6:
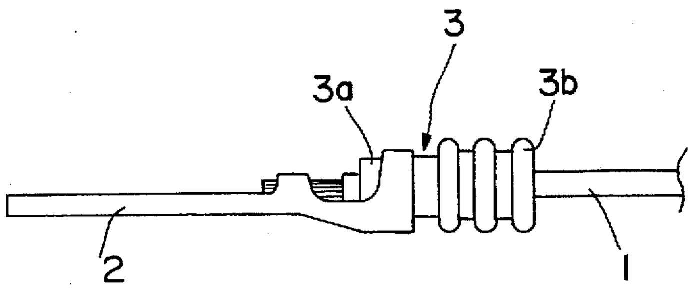
FIG. 6 is a side view showing the rubber plug and terminal fitting mounted at one end of the wire.

A second modification is shown in FIG. 5. Large diameter portion 14b as a deformation permitting portion provides contact holding portion 13 only at the contiguous transitional portion between neck 3a and main portion 3b, and stop 24 is located beyond large diameter portion 14b in the downstream direction and in contact with end face 3d of neck 3a when plug 3 is held by holder 12. The remaining construction is the same as the foregoing embodiment.

Stop 24 securely restricts downstream movement of plug 3 during insertion of the wire. Thus, plug 3 is firmly held, thereby enabling an even smoother wire insertion. Further, since plug 3 can be accurately mounted in the predetermined position, problems resulting from displacement thereof during the cramping of the terminal fitting can be prevented.

While only a limited number of embodiments of the Invention have been expressly described, such modifications as would suggest themselves to the person or ordinary skill are included in the disclosure hereof. For example, stop 24 may be located within contact holding portion 13 of holder 12. These and other changes may be made in the Invention without departing from the scope and spirit thereof. Therefore, it is to be broadly construed and not to be limited except by the claims appended hereto.

What we claim is:

1. A holder for an elastic part having both an opening therein into which an elongated element is to be inserted in a downstream insertion direction, and a gripped portion at which said elastic part is adapted to be held, said holder comprising a contact holding portion adapted to embrace said gripped portion, said contact holding portion comprising a gripping portion and a deformation permitting portion adapted to accommodate radially outward deformation of said elastic part resulting from insertion of said elongated element into said opening, said deformation permitting portion comprising an annular groove in an inner surface of said holder, said gripping portion comprising an upstream holding portion adjacent said annular groove and a downstream holding portion adjacent said annular groove, said annular groove being between said upstream holding portion and said downstream holding portion.

2. The holder of claim 1 wherein said annular groove is downstream of said contact upstream holding portion and contiguous therewith.

3. The holder of claim 1 comprising a stop downstream of said contact holding portion which restricts movement of said elastic part in said downstream direction while said elastic part is held by said holder.

4. The holder of claim 1 wherein said elastic part has a main portion, upstream of said gripped portion, said main portion having a main diameter greater than that of said gripped portion; said holder having a large diameter portion of upstream of said contact holding portion and having a large diameter greater than said main diameter, whereby a plurality of elastic parts, each having a different main diameter can be individually accommodated by said large diameter portion.

5. The holder of claim 1 wherein said elastic part has a main portion, upstream of said gripped portion, said main portion having a main diameter greater than that of said gripped portion; of said holder having a large diameter portion upstream of said contact holding portion and having a large diameter equal to or slightly smaller than said main diameter, whereby said elastic part is gripped at said main portion by said large diameter portion.

6. The holder of claim 5 wherein said large diameter portion is contiguous with said contact holding portion.

7. The holder of claim 1 wherein said wire is inserted directly into said opening.

* * * * *